Patented Aug. 28, 1934

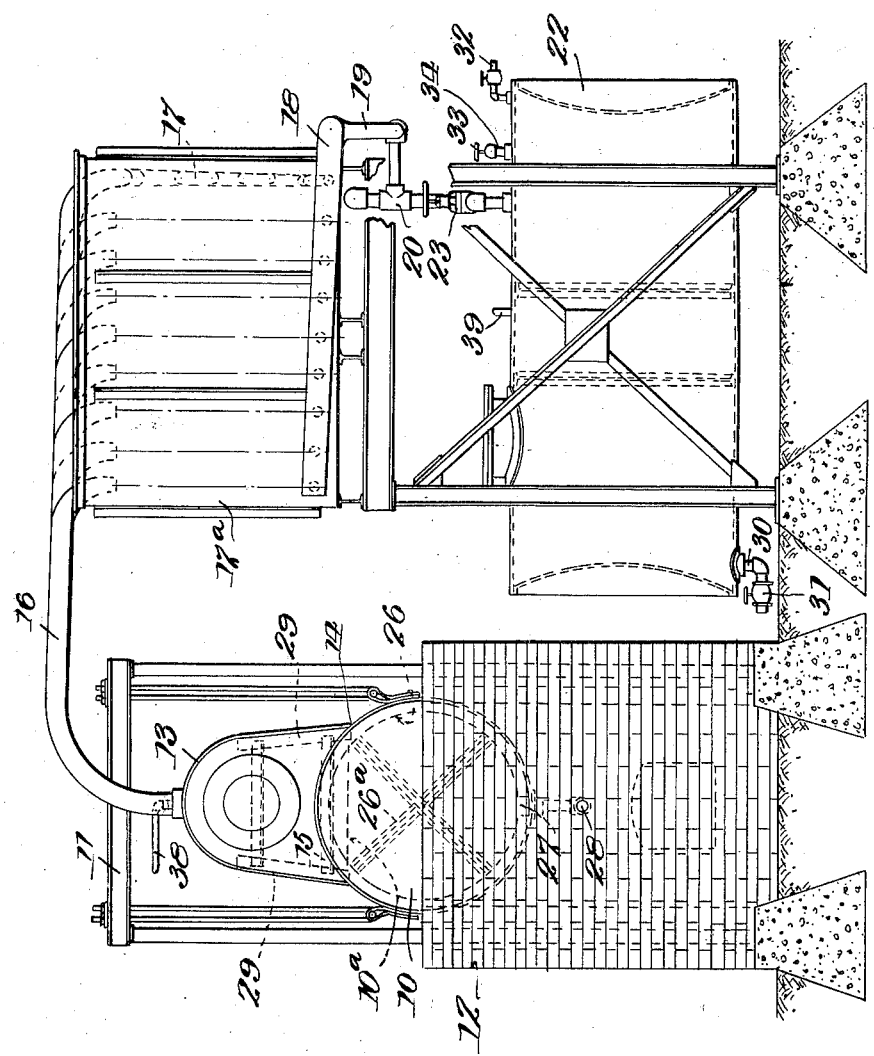

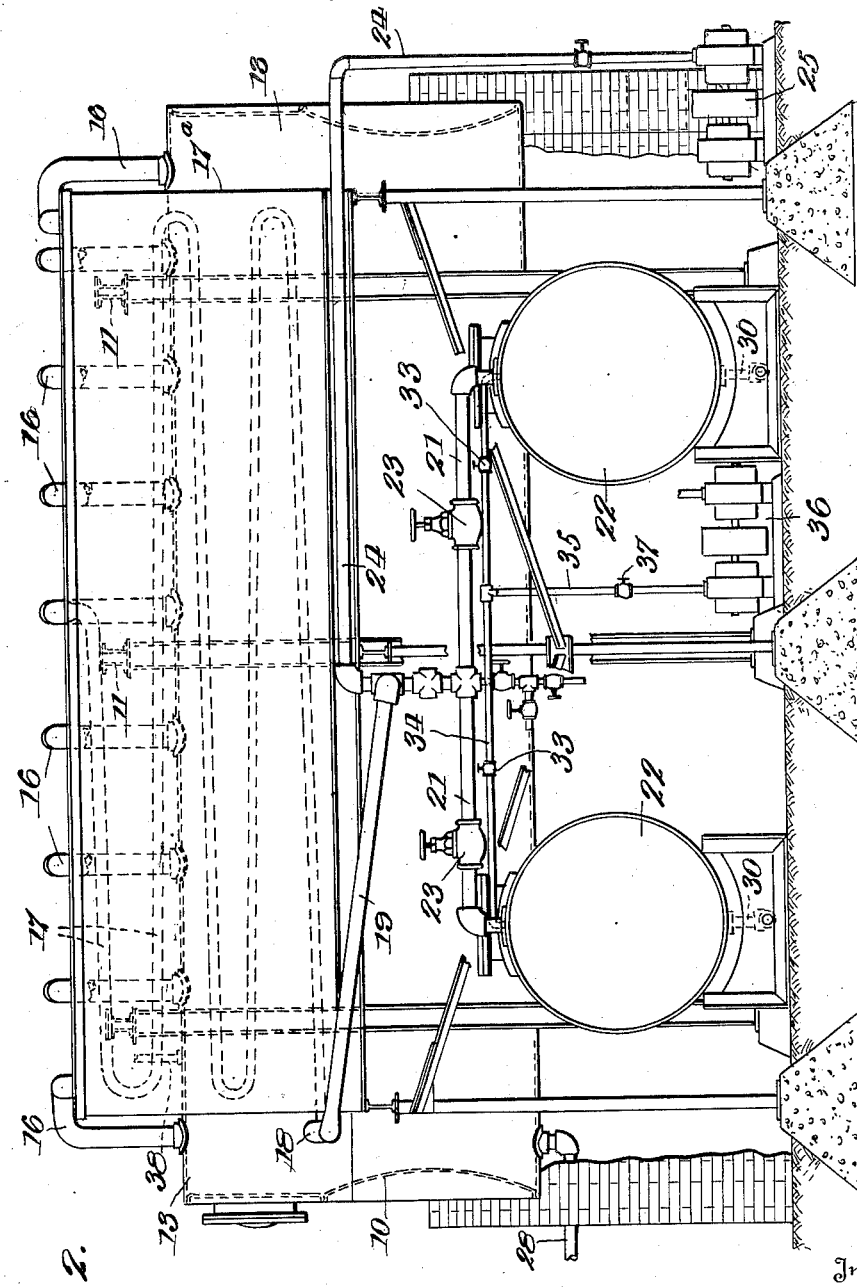

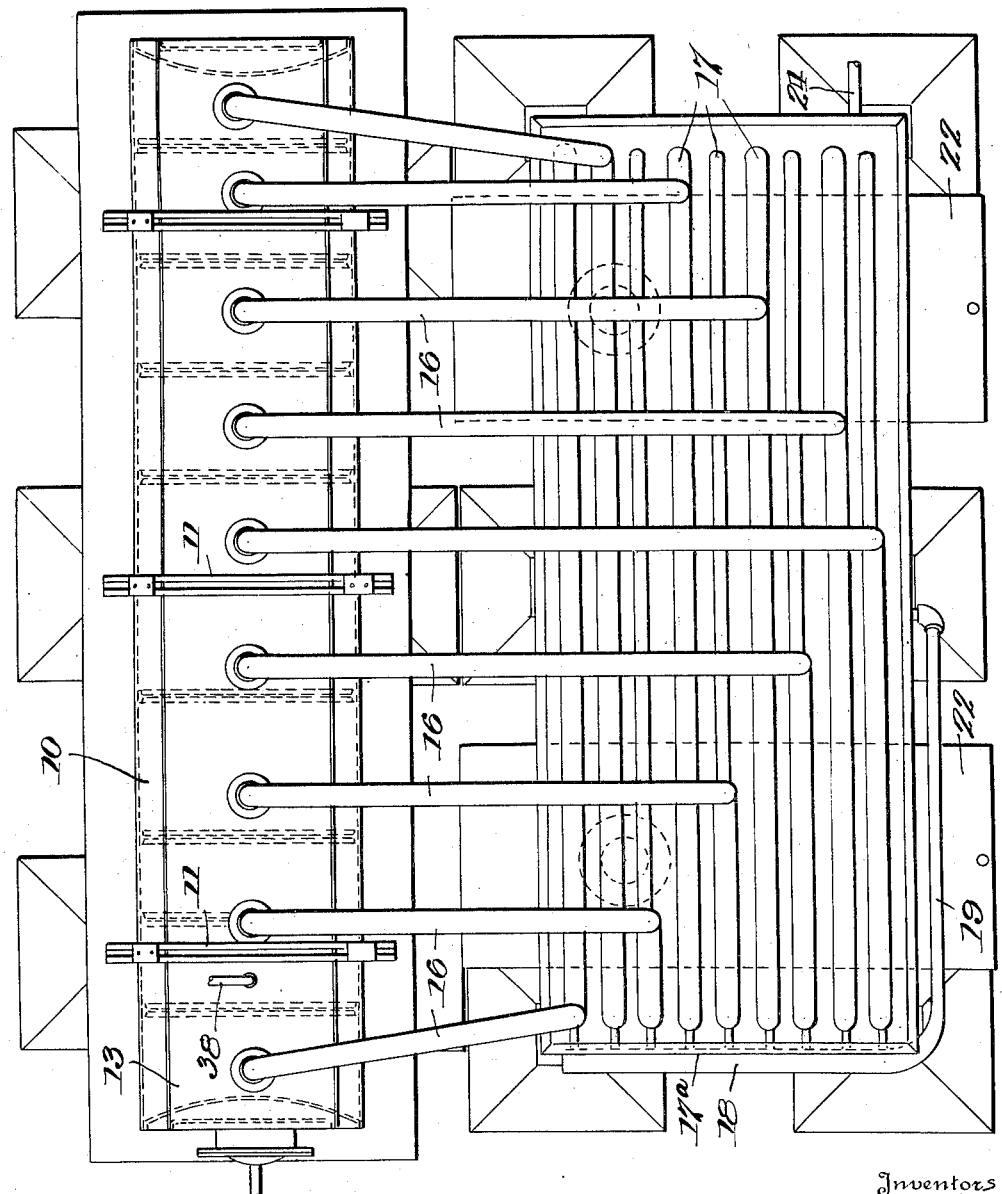

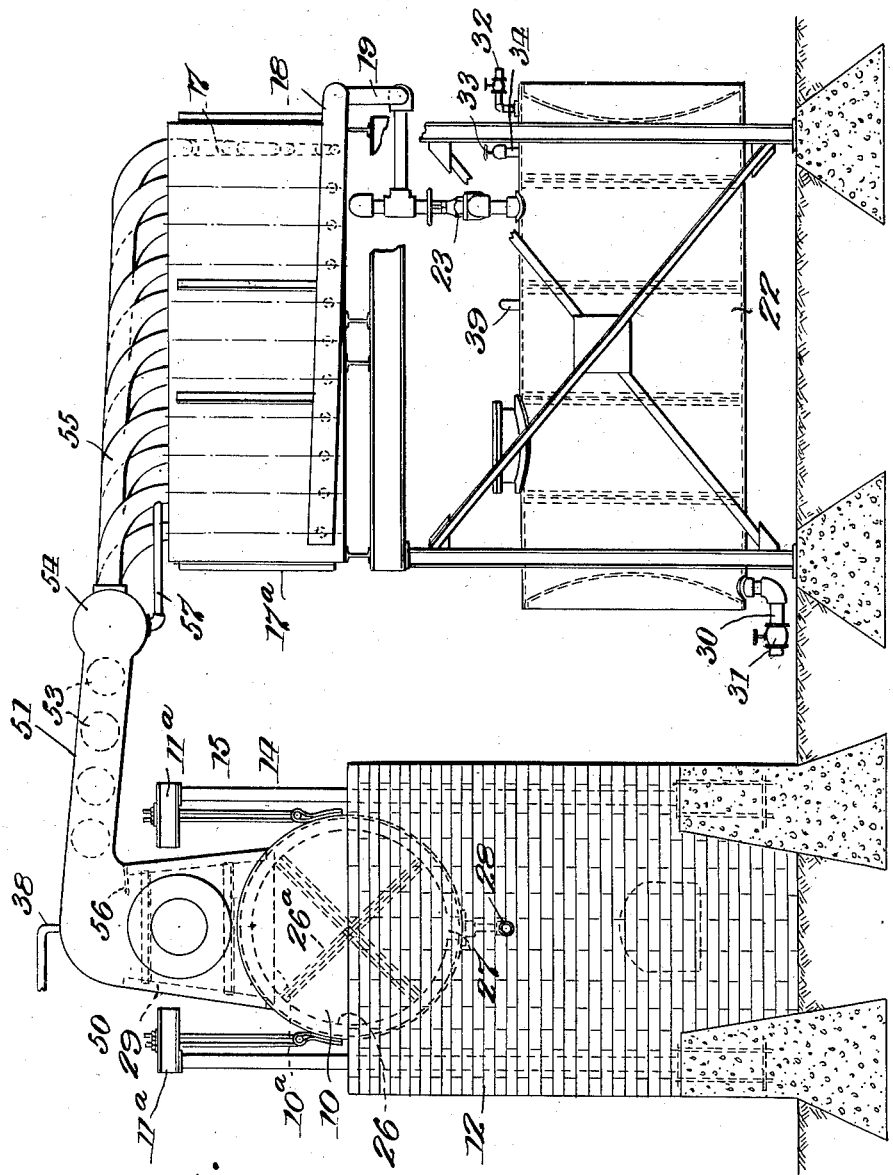

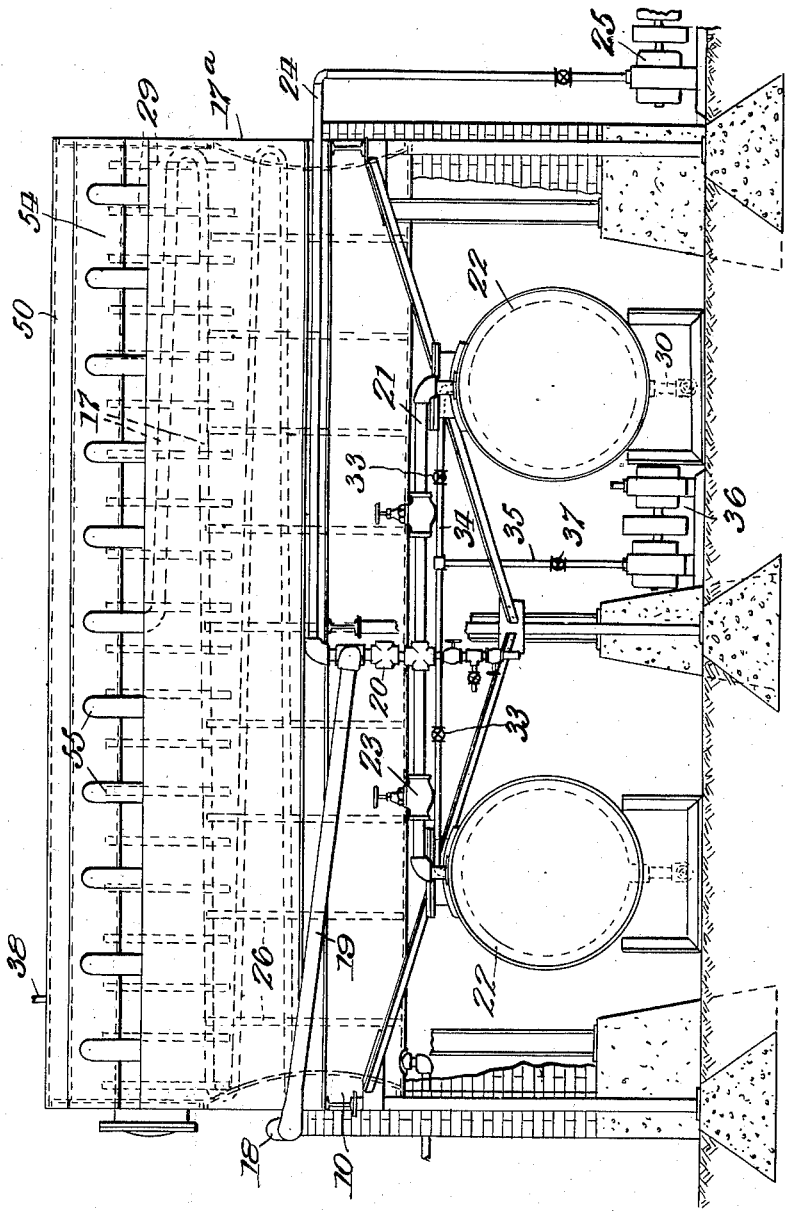

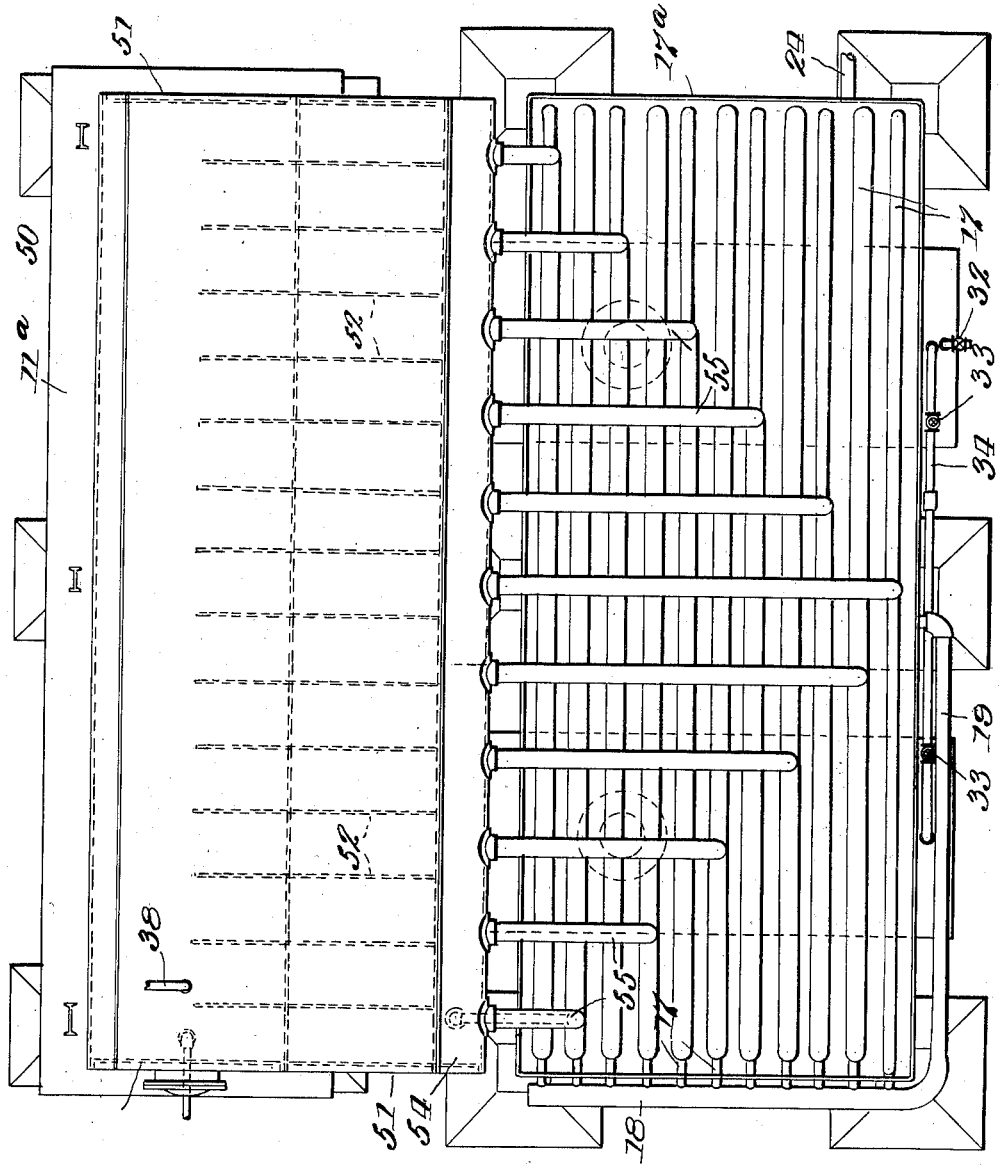

1,971,355

UNITED STATES PATENT OFFICE 1,971,355

DISTILLING APPARATUS

John E. Schulze and Thomas E. McArdle, Chicago, Ill., assignors to Red River Refining Company, Inc., Shreveport, La., a corporation of Louisiana Application May 16, 1922, Serial No. 561,393
Renewed December 19, 1931

9 Claims. (Cl. 196—136)

This invention relates to distilling apparatus; and it is concerned more particularly with apparatus of especially great utility in the distillation or refining of oils such as petroleum and fractions thereof, petroleum and other oil residues, and the like.

A principal object of the invention is to provide distilling apparatus of a type by means of which distillation vapors may be conducted directly and expeditiously away from or out of the heating zone in which they are evolved, without substantial refluxing to said heating zone. Another and general object of the invention is to provide apparatus by means of which distillation can be conducted with maximum rapidity and with exposure of the material undergoing distillation to heat for a minimum period of time. A further object is to provide apparatus of the character above set forth which is especially adapted for distillation under reduced pressure and, in particular, under extremely low absolute pressure of an order of magnitude corresponding to only a few millimeters of mercury. Still another object of the invention is to provide apparatus of comparatively simple construction wherein the foregoing and other desirable objects can be attained effectively in commercial practice.

With the foregoing objects in view, as well as others which will become apparent from the description hereinafter, our invention consists in the novel parts, features of construction, and combinations of parts which will first be described in connection with specific illustrative examples of apparatus embodying the novel principles involved and will then be more particularly pointed out in the appended claims.

Generally described, apparatus constructed in accordance with the invention, embodies a distilling chamber proper which may be of any well known or suitable shape, but which is most desirably one of the horizontal cylindrical type, having in conjunction therewith provision for an ample vapor space above the maximum liquid level maintained in the distillation chamber, together with vapor offtake means of capacity ample to ensure that the distillation vapors may pass rapidly from the aforesaid vapor space; the whole arrangement being such as to facilitate to a maximum degree the free and rapid passage of evolved vapors into the vapor space above the material being distilled and thence away to a place of condensation. In particular it is desirable that, generally speaking, vapors evolved in different localities in the distillation chamber shall all be able to reach a point of exit from the vapor space with approximately the same distance of travel, and apparatus falling within the scope of the present invention is designed in such manner as to substantially accomplish this purpose. With the foregoing generally described assemblage of apparatus elements are combined auxiliary features such as condensing means, receiving means for condensate, and, where the apparatus is to be used for distillation under reduced pressure, appropriate means for producing and maintaining the desired degree of vacuum in the system. As will appear, the apparatus is especially well adapted for distillation of petroleum oils and residua under very low pressure in accordance with the process described and claimed in the prior application of John E. Schulze, Serial No. 544,931, filed March 18, 1922 (Patent No. 1,448,709, March 13, 1923); but the apparatus is also capable of use in distillation methods generally, including, for example, distillation at normal pressure, either with or without steam.

The provision for obtaining ample vapor space in conjunction with the distillation chamber proper may take various forms, but in general it is found in practice that the most satisfactory provision for this purpose is some form of dome means that extends either continuously or not, but most desirably continuously, over at least the major portion of the distillation chamber proper. Such an arrangement satisfies the requirement that different portions of vapor, although evolved or originating in different localities of the distillation chamber, have to travel only about the same distance in passing into the vapor space and making an exit therefrom. In the most desirable embodiment of our novel apparatus now known to us, such dome means is practically co-extensive with the exposed upper surface of the body of liquid in the distillation chamber, and there should be free and unobstructed communication between the distillation chamber proper and said dome means. The requirement for free and unobstructed communication is not to be understood as excluding proper employment of means to guard against mechanical carrying over of entrained liquid particles with the distillation vapors; but in any case the presence of anything that substantially restricts or throttles the flow of vapor from its point of evolution into and through the vapor space and offtake means should be avoided for attainment of best results.

The vapor offtake means cooperating with the aforesaid provision for ample vapor space should, in accordance with the principles of the invention, be of such character as to ensure continued freedom of vapor flow, while at the same time conforming to the desirable condition of uniformity in length of travel path for vapors taken off from different parts of the aforesaid vapor space. In practical work this may be accomplished by various forms of offtake means. For example, a plurality of goosenecks of ample cross sectional area may be provided leading from the vapor dome at relatively closely spaced intervals along the entire extent thereof so that streams of vapor may flow in parallel therefrom. Whether the dome means be continuous or not over the entire extent of the surface of the liquid in the still chamber proper, the series of offtakes in the particular arrangement just mentioned should most desirably be of such character and arrangement as to provide vapor outflow paths having their entrances distributed all along the longitudinal extent of the dome. In this way the distillation vapors, no matter in what part of the still they are evolved, have only a certain distance to travel before finding an exit, which distance is approximately uniform for all parts of the still. Another form which the offtake means may take, and one which possesses particular advantages in actual practice, is a construction which can be considered to be a plurality of goosenecks or offtakes merged into a unitary offtake member which is substantially co-extensive with the dome means, thus providing a vapor exit that is substantially continuous along the entire length, say, of the dome means without any separation into parallel streams of outflowing vapor other than as may be effected incidentally by the provision of proper internal structural bracing of the offtake means in question. In general, whatever form of distributed offtake means is employed should be of such character and arrangement as to provide free and unrestrained exit of the vapors from the vapor space above the still proper and to avoid creating any back pressure in the still. The offtake means may advantageously be such as to favor rapid condensation of the distillation vapors therein and flow of the condensate in a direction away from the aforesaid vapor space. This is in contrast to the effect desired in the dome means or vapor space where condensation of the vapors and consequent refluxing thereof to the still proper are to be avoided as far as possible.

The principles underlying our invention will now be explained in greater detail in connection with certain specific practical still constructions embodying the principles of the invention and illustrated in the accompanying drawings forming a part hereof. The particular constructions chosen for purposes of explanation are especially adapted for use in distillation at very low absolute pressures. It is to be understood, however, that the constructions so illustrated and hereinafter described are merely typical of constructions falling within the scope of the invention, and that the invention is not in any sense restricted to the specific details here illustrated by way of a concrete explanatory example.

In the drawings referred to,

Fig. 1 is a rear elevation of an apparatus installation embodying the principles of the invention;

Fig. 2 is a side elevation thereof;

Fig. 3 is a top plan of said installation, and

Figs. 4, 5 and 6 are similar views, respectively, of a somewhat different specific construction also embodying the principles of the invention.

Referring first more particularly to the installation illustrated in Figs. 1, 2 and 3, this embodiment of the invention is of the type in which the offtake means comprises a plurality of ample capacity goose necks taking vapor from the dome means at a plurality of rather closely spaced points along the entire length thereof. At 10 is the still chamber proper which in this instance is of the well known horizontal cylindrical type suitably suspended, as shown, from an overhead framework 11 and having its lower portion encased in brickwork 12, said brickwork also housing firing means of any suitable character permitting of close regulation and control. Surmounting the horizontal cylindrical still 10 is what may be termed a manifold vapor dome 13, which is generally semi-elliptical in cross-section with its sides flaring downward from the rounded top to the lines where its lower edges are secured to the cooperating edges of the opening provided in the upper side of the horizontal cylindrical still 10 and extending its entire length. As here shown, said manifold dome 13 extends the entire length of the still, providing a vapor space or chamber of substantial height above the maximum liquid level indicated by the dotted line 10$^a$, said vapor space being directly accessible to vapors evolved in the still chamber below by direct vertical ascent and, in this instance, without any obstruction whatever to such vapor flow with the exception of occasional internal bracing members 15 or the like, the obstructing effect of which is negligible from a practical standpoint. In order that evolved vapors may be conducted in generally parallel streams simultaneously from substantially all points along the length of the manifold dome, there is provided distributed offtake means comprising, in this instance, a sufficiently large plurality of goose necks or vapor offtakes 16, nine in this instance, each of the series taking vapor from the dome near the median line of the dome at its topmost portion. These vapor offtakes are of ample dimensions in order to cooperate with the elongated dome means 13 in facilitating rapid removal of distillation vapors as fast as they are formed. The said goosenecks or offtakes 16 lead to suitable condenser or cooling means which may take various forms within our invention. The form of condenser means here shown has certain practical advantages, however. In this arrangement each gooseneck 16 extends in a generally horizontal direction away from the vapor box 13, but has a slight downward slope toward a condenser or cooling coil 17 into which it discharges as shown. The nine condenser or cooling coils 17, corresponding to the nine offtakes 16, are immersed in water or other cooling liquid in a tank or box 17$^a$. All the condenser coils 17 discharge in this particular instance into a manifold or header 18 arranged adjacent one end of the condenser box, said header 18 being connected by suitable piping 19, 20, and 21 to distillate-receiving tanks 22, into either of which the condensed distillate may be directed by proper manipulation of shut-off valves 23. Pipe 24, which is in communication with the piping 19, 20, 21, goes to the intake of a vacuum pump indicated more or less diagrammatically at 25. This vacuum pump should be of a type capable of maintaining a reduced pressure of as low as 1.0 to 1.5 millimeters of mercury absolute throughout the entire system of still, condenser and receiving tanks. Pumps of this character are now obtainable commercially, and no special description thereof is necessary here.

Returning now to the still proper, it will be noted that the horizontal cylindrical body of the still is internally braced and strengthened by peripheral or circumferential ribs 26 and cross-braces 26a. Said peripheral ribs 26 are interrupted or left open at the bottom of the still as indicated at 27 in order that the distillation residues may be drawn off easily in hot fluid condition through the draw-off pipe 28 at the rear of the still. Said draw-off pipe is connected to a residue line (not shown), from which, in this instance, the still may also be charged. The manifold vapor dome or box 13 may also be internally provided with lateral stiffening ribs 29 as shown, in addition to the cross braces 15 before mentioned. Since it is ordinarily desirable to avoid refluxing distillate back into the still, the upper portion of the cylindrical still body projecting above the brickwork 12, as well as the manifold vapor dome 13 and the upwardly curving parts of the goosenecks 16 may, if desired, be covered with lagging of heat insulating material to aid in preventing condensation of vapors on the walls of those portions of the apparatus. Such provision is not essential, however, as it is a simple matter to avoid substantial refluxing by properly controlling the firing of the still. Condensation of a considerable proportion of vapors may and desirably does occur, however in those portions of the offtakes 16 that slope slightly downward toward the cooling coils 17, such condensation at this point aiding very materially in maintaining the desired degree of reduced pressure in the still, assuming that the still is being operated under reduced pressure. Accordingly, means (not shown), may desirably be provided to cool those portions of the offtakes 16, as, for example, by showering water thereupon.

The manifold dome extends to a substantial height above the cylindrical body of the still proper, both because it is desirable that the vapor space in said dome shall be ample, and also because it is desirable that the mouths of the offtakes 16 shall be at a considerable distance above the liquid level in the still in order to diminish the chances for mechanically carrying over liquid particles of oil with the distillation vapors. As regards the cubic capacity of the offtake manifold dome it is well in practice to have this capacity as much as half the cubic capacity of the cylindrical still body, or thereabouts. As before pointed out, this provision of ample cubic capacity for accommodating vapor flow should also be carried out in the case of the goosenecks or other offtake means. This arrangement makes for rapidity of distillation, whether under reduced pressure or not, thus cutting down the period of time that the oil, for example, is exposed to distilling temperatures and consequently cutting down the amount of decomposition that would otherwise take place.

Without limiting the invention to the employment of any particular dimensions or proportions in the construction of the apparatus, specific dimensions may be referred to in connection with the type of apparatus just described for the purpose of indicating one example of proportions proper to employ in apparatus within our invention. In the particular instance here chosen for that purpose, the cylindrical still body of circular cross section may have an internal diameter of 5 feet and a length of 25 feet; while the manifold vapor dome or box may extend to a height of 5½ feet above the center line of the cylindrical still body and may be in the neighborhood of 3½ feet wide where it joins said body. In general, for attainment of best results, we consider it undesirable for the width of the dome, where it joins the still body, to be less in width than one-fourth the diameter of said body. The nine offtakes or goosenecks are desirably of at least 6 inches internal diameter and may even be considerably larger to good advantage. They are desirably spaced apart substantially uniformly along the entire length of said manifold dome. In the specific example given, the combined or aggregate cross-sectional area of the vapor outlets is approximately 1.4 per cent of the maximum cross-sectional area of the still.

It will be noted by reference more particularly to Figs. 1 and 3 that the offtakes leading from the manifold vapor dome 13 extend to different distances therefrom. In the present instance, the middle offtake extends the farthest, going to the far side of the condenser tank to connect with its cooperating cooler or condenser coil; while the other offtakes are successively shorter on both sides of the middle offtake, the connections to the respective cooling coils being thus staggered on opposite sides of said middle offtake.

Each receiver 22 has a discharge pipe 30, valved at 31, by means of which the receiver may be emptied after closing the corresponding valve 23 and opening bleeder valve 32 to atmosphere. The receiver may be evacuated again by closing valves 31 and 32, and opening the corresponding valve 33 in the vacuum line 34, which latter is connected by pipe 35 to the intake of auxiliary vacuum pump 36 through valve 37. When the proper degree of vacuum has been reestablished in the receiver 22, valve 33 is closed and valve 23 is opened. The receivers can thus be emptied without breaking the vacuum in the system.

The dome 13 has a connection 38 to a manometer gage (not shown), and each receiver 22 is provided with a similar manometer connection 39.

The installation illustrated in Figs. 4, 5 and 6 is similar in general principles of construction and operation to that previously described, but it embodies certain particularly desirable features and arrangements that offer important practical advantages in some respects. In this installation, the horizontal cylindrical still body 10 and numerous other constructional features are the same as previously described, and the same reference numerals are therefore employed to indicate parts that are substantially the same in both constructions. The still body is suspended from framework 11a. The manifold vapor dome 50 is somewhat taller than in the installation first described; and the offtake system, instead of consisting of separate pipes entering the top of said vapor dome at spaced points along the length thereof, consists of a flattened vapor box or offtake member 51 extending continuously the entire length of the manifold vapor dome, and communicating therewith all along one side thereof near the top, as shown. Said vapor box leads directly away laterally and slightly downward from the top of said dome, as clearly shown in Fig. 4. Said offtake or vapor box member 51 may be internally braced by I-plates 52 or the like arranged parallel to each other and to the direction of vapor flow in such manner as to offer the minimum obstruction to such vapor flow; and said I-plates may be transversely apertured as indicated at 53, for example. The vapor box 51 may terminate in a manifold 54 from which lead extension offtakes or goosenecks 55. The latter, which may be of smaller diameter than the main offtake 51, serve to lead any uncondensed vapors from the manifold 54 to cooling or condensing coils 17 which in this instance are the same in all essential respects as those described in connection with the first form of apparatus. Beyond these coils 17, the remainder of the apparatus parts are substantially the same as already described.

At 56 is indicated a baffle member or lip secured to the inner wall of the vapor dome 50 just below the exit opening by which the vapors pass into the offtake member 51. This baffle 56 extends the whole length of the dome, and while offering no objectionable obstruction to the flow of vapor in said offtake, does have the effect of preventing liquid oil droplets from being swept up the adjacent wall of the vapor dome and over into the gooseneck member 51. As before, the portion of the cylindrical still that is exposed above the brickwork, as well as the dome 50, may be lagged with insulation if desired to prevent condensation of the vapors and refluxing. Condensation of vapors in the vapor box or offtake member 51 is unobjectionable, however, and in fact it is desirable to relieve that portion of the system from vapors by rapid condensation and thus facilitate very rapid passage of vapors into the vapor box from the vapor dome. The manifold 54 is inclined slightly toward one end where drain connection 57 serves to transfer condensate from manifold 54 into an adjacent offtake extension 55, as shown. Condensation in the vapor box or offtake member 51 may advantageously be facilitated, if desired, by any suitable cooling means, in addition to air cooling, as for example by the use of suitable water spray means (not shown).

This flat vapor box form of distributed offtake very greatly increases the rate at which distillation can be carried on, and we consider it one of the best forms now known to us.

Again without limiting the invention in any way to particular dimensions or proportions in actual construction, it may be stated that in one particularly desirable practical installation of the type last described, where the horizontal cylindrical still proper had an interior diameter of 5 feet and a length of 25 feet, as before, it was found desirable to have the dome 50 extend to a height of 6½ feet above the center line of said cylindrical still body; while the vertical width of the flat vapor box 51 in that particular construction was 24 inches at the mouth or point of junction with the dome, narrowing to 16 inches adjacent the manifold 54.

All piping from the vapor offtake means clear through to the receivers should be of such ample diameter as always to ensure a free space above liquid passing therethrough. This is important, especially where the apparatus is used for vacuum distillation, to ensure proper action of the main vacuum pump 25 in establishing the desired extremely low pressure throughout the whole system including especially the still itself. In order to avoid leakage of air into the system, with consequent poor vacuum as well as oxidation and discoloration of the distillates, great care must be exercised to obtain absolutely tight joints. We find it advisable in practice to electrically weld all joints from the junction of the dome with the still body to and including the connections of the condenser coils 17 to the header or manifold 18. From there on to the receivers, the joints are exposed to considerably less heat and are not necessarily welded.

What we claim is:

1. Distilling apparatus comprising the combination, with a distillation chamber proper having the major portion of its upper part open, of dome means surmounting said chamber and cooperating with such open upper part to provide an enclosed vapor space, communication between said chamber and said dome means being substantially unobstructed, large-capacity offtake means leading from said dome means, and vacuum pump means connected to said offtake means and capable of maintaining said chamber under low absolute pressure during distillation.

2. Distilling apparatus comprising the combination, with a distillation chamber proper having the major portion of its upper part open, of dome means surmounting said chamber and cooperating with such open upper part to provide an enclosed vapor space, communication between said chamber and said dome means being substantially unobstructed, vapor offtake means providing a distributed exit for vapors from said dome means, and vacuum pump means connected to said offtake means and capable of maintaining said chamber under low absolute pressure during distillation.

3. Distilling apparatus comprising the combination, with a distillation chamber proper, of cooperating dome means surmounting said chamber and providing a vapor space having substantially unobstructed communication with said chamber and being directly accessible to vapor from all parts of the surface of a body of liquid in said chamber by paths of substantially equal length, large-capacity offtake means leading from said dome means, and vacuum pump means connected to said offtake means and capable of maintaining said chamber under low absolute pressure during distillation.

4. Distilling apparatus comprising the combination, with a distillation chamber proper, of cooperating dome means providing a vapor space having substantially unobstructed communication with said chamber and being directly accessible to vapor from all parts of the surface of a body of liquid in said chamber by paths of substantially equal length, vapor offtake means providing a distributed exit for vapors from said dome means, and vacuum pump means connected to said offtake means and capable of maintaining said chamber under low absolute pressure during distillation.

5. Distilling apparatus comprising a horizontal cylindrical still body providing a distillation chamber surmounted by dome means extending over the greater part of said still body and having substantially unobstructed communication with said chamber, in combination with relatively large-capacity offtake means for taking vapor from said dome means at a plurality of points, and vacuum pump means connected to said offtake means and capable of maintaining said chamber under low absolute pressure during distillation.

6. Distilling apparatus comprising the combination, with a horizontal cylindrical still body, of a dome surmounting the same and substantially coextensive in length therewith, communication between said still body and dome being substantially unobstructed, large-capacity offtake means leading from said dome, and vacuum pump means connected to said offtake means and capable of maintaining said chamber under low absolute pressure during distillation.

7. Distillation apparatus comprising the combination, with a horizontal cylindrical still body providing a distillation chamber of a dome surmounting the same and having substantially unobstructed communication therewith for the major part of the length of the still body through an opening not substantially narrower than one-fourth the diameter of said still body, large-capacity offtake means leading from said dome, and vacuum pump means connected to said offtake means and capable of maintaining said chamber under low absolute pressure during distillation.

8. Distilling apparatus comprising the combination, with a horizontal cylindrical still body, of a dome surmounting the same and communicating therewith for the major part of the length of the still body through an opening not substantially narrower than one-fourth the diameter of said still body, and offtake means in the form of a flat vapor box communicating with said dome through a substantially continuous vapor outlet extending practically the entire length of said dome.

9. Distilling apparatus comprising the combination, with a horizontal cylindrical still body, of a dome surmounting the same and communicating therewith for the major part of the still body through an opening not substantially narrower than one-fourth the diameter of said still body, vapor offtake means in the form of a flat vapor box communicating with said dome through a substantially continuous vapor outlet extending practically the entire length of said dome, a manifold or header into which vapors pass from said flat vapor box, a plurality of offtakes leading therefrom respectively into separate condensing or cooling coils, and a header or manifold into which said coils lead.

JOHN E. SCHULZE.
THOMAS E. McARDLE.